United States Patent Office 3,523,948
Patented Aug. 11, 1970

3,523,948
2-HETEROCYCLIC AMINO DERIVATIVES OF SPIRO(CYCLO-PROPANE-1,9′-FLUORENE)
Carl Kaiser, Haddon Heights, N.J., and Charles L. Zirkle, Philadelphia, Pa., assignors to Smith Kline & French Laboratories, Philadelphia, Pa., a corporation of Pennsylvania
No Drawing. Original application Mar. 7, 1966, Ser. No. 532,067, now Patent No. 3,419,604, dated Dec. 31, 1968. Divided and this application July 24, 1968, Ser. No. 747,084
Int. Cl. C07d *51/70*
U.S. Cl. 260—268                7 Claims

ABSTRACT OF THE DISCLOSURE

Heterocyclic amino derivatives of spiro(cyclopropane-1,9′-fluorene) wherein the fluorene ring may be halogen, trifluoromethyl, lower alkyl, lower alkoxy, lower alkylthio or lower alkylsulfonyl substituted have antidepressant and stimulant activity. The compounds are generally prepared via the spiro(cyclopropane-1,9′-fluorene)-2-carboxylic acids.

---

This application is a division on application Ser. No. 532,067 filed Mar. 7, 1966 now U.S. Pat. No. 3,419,604.

This invention relates to novel heterocyclic amino derivatives of spiro(cyclopropane-1,9′-fluorene) having useful pharmacodynamic activity. More specifically, the compounds of this invention have antidepressant and stimulant activity as measured by standard experimental pharmacological procedures. In the rat dose range, oral dosages of 100 to 200 mg./kg. produce moderate to marked mydriasis, piloerection and increased motor activity. In mice, oral dosages of 10 to 50 mg./kg. prevent reserpine-induced ptosis. This latter procedure demonstrates an imipramine-like effect.

The novel spiro(cyclopropane-1,9′-fluorenes) of this invention may be represented by the following general structural formula:

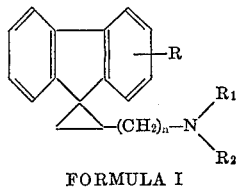

FORMULA I in which:
R represents hydrogen, halogen such as chlorine, bromine or fluorine, trifluoromethyl, lower alkyl such as methyl, lower alkoxy such as methoxy, lower alkylthio such as methylthio or lower alkylsulfonyl such as methylsulfonyl, preferably in the 2-position of the fluorene portion of the ring system;

*n* represents an integer from 0 to 2; and

R₁ and R₂, taken together with the nitrogen atom to which they are attached, represent a heterocyclic amino group containing up to 15 carbon atoms, for example a pyrrolidine, piperidine, N′-methyl-piperazine, N′-(β-hydroxyethyl)-piperazine or N′-(β-actoxyethyl)-piperazine ring.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethandisulfonic, sulfamic, succinic, cyclohexylsulfamic, fumaric, maleic, benzoic and the like. These salts are readily prepared by methods known to the art.

The compounds of this invention when R in Formula I above is different from hydrogen may be present as cis-trans isomers due to the geometrical arrangement of the fluorene ring substituent and the amino moiety with respect to the spiro ring system and further as *d, l* optical isomers. Unless otherwise specified in the description and accompanying claims, it is intended to include all isomers, whether separated or mixtures thereof.

The novel spiro(cyclopropane-1,9′-fluorenes) of this invention are prepared by several methods, the choice of which depending on the definition of *n*. The starting materials for these methods are general spiro(cyclopropane-1,9′-fluorene)-2-carboxylic acids having the formula:

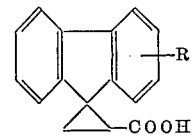

FORMULA II in which R is defined in Formula I. These compounds are prepared from appropriate 9-fluorenones which are either known or are prepared by methods known to the art. Thus, the 9-fluorenone is reacted with hydrazine to give the hydrazone derivative which is converted with mercuric oxide to the corresponding 9-diazofluorene. The latter is reacted with ethyl acrylate to give an ethyl spiro (cyclopropane-1,9′-fluorene)-2-carboxylate which is hydrolyzed with alkali to give the carboxylic acid of Formula II. When the fluorene ring is substituted by other than hydrogen as defined by R above, a mixture of isomeric carboxylic acids is obtained which can be separated by fractional crystallization.

The useful compounds of Formula II are converted to amino compounds of this invention by several routes. Reaction of the carboxylic acid with either a thionyl halide or a lower alkyl haloformate gives the corresponding acid halide or lower alkyl mixed anhydride which is then treated with a heterocyclic amine to give a 2-carboxamidospiro(cyclopropane-1,9′-fluorene). Reduction of the amide with, for example, lithium aluminum hydride gives the corresponding 2-heterocyclic aminomethyl derivatives of Formula I.

The novel compounds of this invention represented by Formula I above where *n* is 2 are prepared by similar reaction of the carboxylic acid of Formula II with either a thionyl halide or a lower alkyl haloformate to give the corresponding acid halide or lower alkyl mixed anhydride which is then treated with diazomethane to yield a 2-diazo-acetyl-spiro(cyclopropane-1,9′-fluorene). A methanolic solution of the latter is rearranged with silver benzoate to give the methyl spiro(cyclopropane-1,9′-fluorene)-2-acetate which is hydrolyzed with alkali to give the 2-acetic acid derivative. Conversion of the acid to either an acid chloride or lower alkyl mixed anhydride, followed by reaction with a heterocyclic amine to give a 2-acetamidospiro(cyclopropane - 1,9′ - fluorene) and reduction of the amide with, for example, lithium aluminum hydride yields the 2-heterocyclic aminoethyl products of Formula I.

Alternatively, the diazoketone above is rearranged with silver oxide in the presence of a heterocyclic amine to give the acetamido derivative directly which is then reduced to the 2-heterocyclic aminoethyl products.

To prepare the compounds of Formula I where *n* is 0, the carboxylic acid of Formula II is converted to either an acid halide or a lower alkyl mixed anhydride as described above and this derivative is then treated with sodium azide to give the corresponding acid azide. The latter is thermally decomposed by heating in an inert organic solvent to give the correponding isocyanate. The resulting isocyanate is hydrolyzed with a mineral acid such as hydrochloric acid or an alkali metal hydroxide such as sodium or potassium hydroxide at elevated temperatures to give a primary amine derivative. The pyrrolidinyl and piperidinyl derivatives of Formula I above are prepared from the primary amine and 1,4-dibromobutane and 1,5-dibromopentane, respectively, in an organic sovent refluxing at a temperature from 100–150° C. and in the presence of potassium carbonate. Similar reaction of the primary amine with methyl bis-($\beta$-chloroethyl)amine gives the N'-methylpiperazinyl derivative.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The foregoing is a general description of the main synthetic routes in the preparation of spiro(cyclopropane-1,9'-fluorenes) of this invention. It will be readily apparent to one skilled in the art that variations of these procedures are possible. The following examples illustrate these procedures but should not be construed as limiting the invention to the specific compounds prepared thereby. Where isomers can exist, the examples are intended to read on the similar employment of either isomer.

PREPARATIONS (A) Spiro(cyclopropane-1,9'-fluorene)-2-carboxylic acid

A mixture of 42 g. of 9-fluorenone, 240 ml. of n-butanol and 30 ml. of 85% aqueous hydrazine hydrate is stirred and refluxed for four hours. The reaction mixture is poured into 600 ml. of ethanol and cooled to 0° C. to give the 9-fluorenone hydrazone, M.P. 153–155° C.

To a rapidly stirring suspension of 33.7 g. of the above hydrazone in 1.5 l. of ether is added a solution of 2.6 g. of potassium hydroxide in 2 ml. of water. Yellow mercuric oxide (18.5 g.) is then added and the resulting mixture is stirred at room temperature for 45 minutes. The ether is decanted and with stirring is again treated with 2.6 g. of potassium hydroxide and 18.5 g. of mercuric oxide. After stirring for 45 minutes an additional 18.5 g. of mercuric oxide is added and stirring continued for 45 minutes. The decanted ether solution is dried and concentrated in vacuo to give 9-diazofluorene, M.P. 95–98° C.

To a solution of 4.8 g. of the above diazo compound in 150 ml. of ether is added 10 ml. of ethyl acrylate. Nitrogen evolution begins almost immediately and the solution is allowed to stand at room temperature overnight. The solution is then concentrated in vacuo to give ethyl spiro(cyclopropane-1,9'-fluorene)-2-carboxylate. The latter is suspended in 100 ml. of ethanol and a solution of 5.6 g. of potassium hydroxide in 10 ml. of water and extracted with ether. The aqueous portion is acidified with acetic acid to give spiro(cyclopropane-1,9'-fluorene)-2-carboxylic acid, M.P. 217–219° C.

(B) Spiro(cyclopropane-1,9'-fluorene)-2-acetic acid

A mixture of 8.9 g. of spiro(cyclopropane-1,9'-fluorene)-2-carboxylic acid and 10 ml. of thionyl chloride is allowed to stand at room temperature for one hour, then is heated at reflux for 15 minutes. The solution is concentrated in vacuo and the residue stripped with toluene. The residual acid chloride is then dissolved in 50 ml. of ether and the ether solution is added to a solution of diazomethane in 400 ml. ether (prepared by addition, in portions, of 23.2 g. of N-methyl-N'-nitro-N-nitrosoguanidine to a mixture of 60 ml. of 50% potassium hydroxide solution and 150 ml. of ether at 0° C., decantation of ether solution, extraction of aqueous portion with ether, and drying of ether solution). The reaction mixture is allowed to stand at room temperature for 12 hours and filtered to give 2 - diazoacetyl - spiro(cyclopropane - 1,9'-fluorene).

To a stirred suspension of 2.6 g. of the above diazoketone in 30 ml. of methanol is added a solution of 0.3 g. of silver benzoate (prepared by reaction of equimolar quantities of sodium benzoate and silver nitrate in an aqueous medium) in 3 ml. of triethylamine. The mixture is stirred at room temperature for 15 minutes, then refluxed for one hour, filtered and the filtrate concentrated in vacuo. The residue is suspended in water, extracted with ether, and the dried extract concentrated to give the methyl ester of the acetic acid derivative.

To a solution of this ester in 25 ml. of ethanol is added a solution of 1.0 g. of potassium hydroxide in 5 ml. of water. The mixture is stirred and refluxed for one hour, then concentrated in vacuo. The residue is dissolved in water and extracted with ether. The aqueous portion is made acidic with acetic acid, extracted with ether and the dried extract concentrated. The residue is recrystallized to give spiro(cyclopropane-1,9'-fluorene)-2-acetic acid.

(C) R-Substituted-spiro(cyclopropane-1,9'-fluorene)-2-carboxylic and -2-acetic acids By employing in part A above the following 9-fluorenones, with similar subsequent reaction as in part B, there are obtained corresponding carboxylic and acetic acid starting materials:

2- and 4-trifluoromethyl-9-fluorenones, 4-isomer: Chem. Abs. 49 3092e
2-methylthio-9-fluorenone
2-, 3- and 4-bromo-9-fluorenones
2- and 3-chloro-9-fluorenones
2, 3- and 4-fluoro-9-fluorenones
2-, 3- and 4-methoxy-9-fluorenones
2- and 3-methyl-9-fluorenones
2-methylsulfonyl-9-fluorenone, Chem. Abs. 51 332d 2-trifluoromethyl-9-fluorenone.—To a stirred solution of 13.3 g. of 2-amino-5-trifluoromethylbenzophenone in 75 ml. of 2 N sulfuric acid is added dropwise at 0–5° C. a solution of 3.9 g. of sodium nitrite in 25 ml. of water. The diazonium suspension is stirred at 0–5° C. for ten minutes, then the cooling bath is removed and the mixture is heated gradually until vigorous nitrogen evolution occurs. After nitrogen evolution is nearly completed the mixture is stirred and refluxed for 30 minutes. The mixture is cooled and extracted with ether. The ether extract is washed several times with 1 N sodium hydroxide, dried and concentrated to give 2-trifluoromethyl-9-fluorenone.

2-methylmercapto - 9-fluorenone.—The diazonium salt prepared from 19.5 g. of 2-aminofluorenone is added slowly to a stirred solution of 48.0 g. of potassium ethyl xanthate in 200 ml. of water at 70–75° C. The mixture is heated at 70° C. for 30 minutes, then it is cooled and extracted with ether. The ether extract is dried and concentrated. The residue is stirred and refluxed for three hours with a solution of 16.8 g. of potassium hydroxide in 50 ml. of water and 175 ml. of ethanol. The mixture is concentrated in vacuo and the residue diluted with water. The mixture is extracted several times with ether, then the aqueous portion is acidified to give 2-mercapto-9-fluorenone. This mercapto derivative (10.6 g.) is stirred with 6.0 g. of sodium hydroxide in 150 ml. of water and heated to 70° C. Methyl sulfate (13.1 g.) is added to the alkaline solution and the mixture is stirred at 70° C. for 30 minutes. The cooled alkaline suspension is extracted with ether and the ethereal extracts dried and concentrated to give 2-methyl-mercapto-9-fluorenone.

EXAMPLE 1

A mixture of 5.4 g. of spiro(cyclopropane-1,9'-fluorene)-2-carboxylic acid and 15 ml. of thionyl chloride is allowed to stand overnight at room temperature. The solution is diluted with benzene and evaporated in vacuo to give the acid chloride. The latter is dissolved in 100 ml. of dry ether and is added slowly to 50 ml. of 40% aqueous dimethylamine, with stirring and heating on the steam bath. After 30 minutes, with the ether having boiled off, the reaction mixture is cooled and the residue is taken up in ether. The ether solution is washed with water, then saturated sodium chloride solution, dried and evaporated in vacuo to yield 2-(N,N-dimethylcarboxamido)spiro (cyclopropane-1,9′-fluorene).

To a stirred suspension of 3.8 g. of lithium aluminum hydride in 200 ml. of dry ether is added slowly to a solution of the above carboxamide in 300 ml. of dry ether. The resulting mixture is stirred and refluxed for 3–4 hours, then decomposed with 3.8 ml. of water, 3.8 ml. of 10% sodium hydroxide solution and 11.4 ml. of water, and filtered. The filtrate is concentrated in vacuo to give 2-(N,N - dimethylaminomethyl)spiro(cyclopropane - 1 , 9′-fluorene); hydrochloride salt, M.P. 244–245° C.

Similarly, by employing 33 g. of N-methylpiperazine instead of dimethylamine in the above reaction sequence, the corresponding 2 - (N - methyl-N′-piperazinylmethyl)-spiro(cyclopropane-1,9′-fluorene) is obtained.

EXAMPLE 2

A mixture of 4'1 g. of spiro(cyclopropane-1,9′-fluorene)-2-acetic acid and 10 ml. of thionyl chloride is allowed to stand at room temperature for one hour, then heated at reflux for 30 minutes, concentrated in vacuo and the residue stripped with toluene. The residual acid chloride is dissolved in 50 ml. of ether and added dropwise to a solution of 4.5 g. of dimethylamine in 125 ml. of ether. The mixture is stirred at room temperature for 15 minutes, then refluxed for one hour. A 40% aqueous solution of dimethylamine (50 ml.) is added and the mixture stirred an additional 15 minutes. The separated organic layer is washed with a saturated solution of sodium chloride, dried and concentrated to give the 2-(N,N-dimethylacetamido)-spiro(cyclopropane-1,9′-fluorene).

A suspension of the above amide in 50 ml. of ether is added to a suspension of 3.4 g. of lithium aluminum hydride in 250 ml. of ether and the mixture is stirred and refluxed for two hours. After standing at room temperature for 12 hours, the reaction mixture is decomposed by the addition, in sequence, of 3.5 ml. of water, 3.5 ml. of 10% sodium hydroxide solution and 11 ml. of water, filtered and the filtrate concentrated in vacuo to give 2 - (N,N - dimethylaminoethyl) spiro(cyclopropane-1,9′-fluorene).

Similarly, by employing in the above reaction sequence 3.9 g. of 2′-methyl-sprio(cyclopropane-1,9′-fluorene) - 2-acetic acid there is obtained as a final product 2′-methyl-2-(N,N-dimethylaminoethyl) - spiro(cyclopropane - 1,9′-fluorene).

EXAMPLE 3

To a mixture of 3.3 g. of 2′-trifluoromethyl-spiro(cyclopropane-1,9′-fluorene)-2-carboxylic acid and 3 ml. of triethylamine, cooled to 0° C., is added 2 ml. of ethyl chloroformate in acetone. The mixture is stirred for 15 minutes and then 4.4 g. of N-(β-hydroxyethyl)piperazine in acetone is added with cooling. After stirring for three hours at room temperature, the reaction mixture is poured into cold water and extracted with ether. The dried extract is evaporated to give 2′-trifluoromethyl-2-[N-(β′-hydroxyethyl)-N′-piperazinoyl]-spiro(cyclopropane-1,9′-fluorene).

To a suspension of 1.0 g. of lithium aluminum hydride in ether is added a suspension of 3.3 g. of the above piperazinoyl derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precpitates the solid 2′-trifluoromethyl-2-[N-(β-hydroxyethyl)-N′-piperazinylmethyl]-spiro(cyclopropane-1,9′-fluorene) hydrochloride. Acetylation with acetyl chloride yields the corresponding β-acetoxyethyl derivative.

EXAMPLE 4

A solution of 8.4 g. of 2′-trifluoromethyl-spiro(cyclopropane-1,9′-fluorene)-2-acetic acid in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice-water, extracted with methylene chloride and the dried extract evaporated. The residue is taken up in ether, extracted with 10% sodium hydroxide solution and the dried ether solution evaporated to give 2′-trifluoromethyl-2-(N,N-dimethylacetamido) - spiro(cyclopropane-1,9′-fluorene).

To 2.5 g. of lithium aluminum hydride in ether is added a solution of 8.4 g. of the above acetamido derivative in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the 2′-trifluoromethyl-2-(N,N-dimethylaminoethyl)spiro(cyclopropane-1,9′-fluorene) -hydrochloride.

Similarly, by employing 11 g. of pyrrolidine or 13 g. of piperidine instead of dimethylamine in the above reaction sequence with subsequent reduction by 2.5 g. of lithium aluminum hydride there is obtained 2′-trifluoromethyl-2-(N-pyrrolidinylethyl)-spiro(cyclopropane-1,9′ - fluorene) or 2′-trifluoromethyl-2-(N-piperidinylethyl) - spiro(cyclopropane-1,9′-fluorene).

EXAMPLE 5

To a solution of 5.3 g. of 2′-chloro-spiro(cyclopropane-1,9′-fluorene)-2-carboxylic acid in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the residual isocyanate derivative.

To a stirred mixture of 50 ml. of 3 M methyl magnesium bromide in ether is added 6.1 g. of the above isocyanate in ether. The mixture is refluxed for two hours, cooled and 200 ml. of 10% hydrochloric acid is added slowly. The separated aqueous layer is extracted with ether. Concentration of the organic solution gives 2′-chloro-2-(N-acetylamino)-spiro(cyclopropane-1,9′ - fluorene).

To a solution of 6.4 g. of the above N-acetylamino derivative in 70 ml. of tertahydrofuran is added 1.0 g. of 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An addition 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give 2′-chloro-2-(N-acetyl-N-ethylamino)-spiro(cyclopropane - 1,9′ - fluorene).

A solution of the above N-acetyl-N-ethylamino derivative (6.8 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give 2′-chloro-2-(N,N-diethylamino)-spiro(cyclopropane-1,9′ - fluorene) hydrochloride.

Direct hydrolysis of the above isocyanate derivative yields 2′-chloro-2-amino-spiro(cyclopropane - 1,9′ - fluorene).

EXAMPLE 6

To a suspension of 4 g. of lithium aluminum hydride in ether is added a solution of 8.6 g. of 2′-chloro-2-(N- acetylamino)-spiro(cyclopropane-1,9'-fluorene) (prepared as described in Example 5) in ether and the mixture stirred and refluxed for eight hours. The reaction mixture is decomposed, filtered and the filtrate evaporated to give 2'-chloro-2-(N-monoethylamino)-spiro(cyclopropane - 1, 9'-fluorene).

EXAMPLE 7

To a suspension of 8.0 g. of spiro(cyclopropane-1,9'-fluorene)-carboxylic acid in 60 ml. of acetone is added 8 ml. of triethylamine in acetone, cooled to −5° C., 6 ml. of ethyl chloroformate in acetone is added and the mixture is stirred for 15 minutes in the cold. A solution of 4.4 g. of sodium azide in water is added, stirred for 30 minutes, poured into ice-water and extracted with toluene. The dried extract is heated until gas evolution ceases and then the solvent is removed to give the corresponding isocyanate derivative. The latter (10.5 g.) is dissolved in 60 ml. of ethanol and stirred and refluxed for two hours. Removal of the solvent in vacuo gives the ethyl carbamate derivative.

A solution of 8.9 g. of the above carbamate in 50 ml. of dimethylsulfoxide is added to a suspension of 1.4 g. of 55.6% sodium hydride (mineral oil) in 35 ml. of dimethylsulfoxide. The mixture is heated briefly, cooled to 20° C. and 7 ml. of methyl iodide is added, maintaining the temperature between 15–20° C. This mixture is heated at 55–60° C. for 30 minutes, poured into 250 ml. of ice-water, extracted with ether and the dried extract evaporated to give 2 - (N - methyl-N-carbethoxyamino)-spiro(cyclopropane-1,9'-fluorene).

To a suspension of 2.5 g. of lithium aluminum hydride in ether is added a solution of 9.0 g. of the above N-methyl carbamate derivative in ether and the mixture is refluxed for four hours. The reaction mixture is decomposed, filtered, and the ether removed to give 2-(N,N-dimethylamino)-spiro(cyclopropane-1,9'-fluorene).

Similarly, 2'-methylthio-spiro(cyclopropane-1,9' - fluorene)-2-carboxylic acid and 2'-methylsulfonyl-spiro(cyclopropane-1,9'-fluorene)-2-carboxylic acid in the above reaction sequence yield 2'-methylthio - 2 - (N,N - dimethylamino)-spiro(cyclopropane-1,9'-fluorene) and 2' - methylsulfonyl-2-(N,N - dimethylamino) - spiro(cyclopropane-1,9'-fluorene), respectively.

To a suspension of 25.9 g. of 2'-bromo-spiro(cyclopropane-1,9'-fluorene)-2-acetic acid in 200 ml. of acetone is added 19 ml. of triethylamine in acetone. The mixture is cooled to −5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated at give 2'-bromo-2-(N,N - dimethylacetamido) - spiro(cyclopropane-1,9'-fluorene).

A solution of 31.4 g. of the above acetamido derivative in 225 ml. of ether is added to a suspension of 8 g. of lithium aluminum hydride in ether and the mixture refluxed for six hours. The reaction mixture is decomposed, filtered and the filtrate evaporated to give 2'-bromo-2-(N,N-dimethylaminoethyl)-spiro(cyclopropane-1,9' - fluorene).

Similarly, by employing in the above reaction sequence 2'-methoxy-spiro(cyclopropane-1,9' - fluorene) - 2 - acetic acid or 2'-fluoro-spiro(cyclopropane - 1,9' - fluorene) - 2-acetic acid there are obtained as final products 2'-methoxy-2-(N,N-dimethylaminoethyl) - spiro(cyclopropane - 1,9'-fluorene) and 2' - fluoro-2-(N,N - dimethylaminoethyl)-spiro(cyclopropane-1,9'-fluorene), respectively.

What is claimed is:

1. A chemical compound selected from the group consisting of a free base and a pharmaceutically acceptable salt thereof, said free base having the formula:

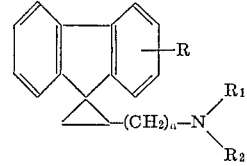

in which:
R is hydrogen, chlorine, bromine, fluorine, trifluoromethyl, methyl, methoxy, methylthio or methylsulfonyl;
$n$ is an integer of from 0 to 2; and
$R_1$ and $R_2$, taken together with the nitrogen atom to which they are attached, represent a N'-methylpiperazine, N'-($\beta$-hydroxyethyl) - piperazine or N' - ($\beta$-acetoxyethyl)-piperazine ring.

2. A chemical compound in accordance with claim 1 in which $R_1$ and $R_2$, taken together with the nitrogen atom to which they are attached, represent an N'-methylpiperazine ring.

3. A chemical compound in accordance with claim 2 in which $n$ is 1.

4. A chemical compound in accordance with claim 3 in which R is hydrogen.

5. A chemical compound in accordance with claim 1 in which $R_1$ and $R_2$, taken together with the nitrogen atom to which they are attached, represent an N'-($\beta$-hydroxyethyl)-piperazine ring.

6. A chemical compound in accordance with claim 5 in which $n$ is 1.

7. A chemical compound in accordance with claim 6 in which R is 2' trifluoromethyl.

References Cited

UNITED STATES PATENTS

| | | | |
|---|---|---|---|
| 3,098,076 | 7/1963 | Baltzly et al. | 260—294.7 |
| 3,309,404 | 3/1967 | Engelhart | 260—293 X |
| 3,335,133 | 8/1967 | Kaiser et al. | 260—239 |
| 3,340,268 | 9/1967 | Missoni | 260—293.4 |
| 3,423,461 | 1/1969 | Kaiser et al. | 260—268 X |

DONALD G. DAUS, Primary Examiner

U.S. Cl. X.R.

260—999